United States Patent
Karlsson et al.

(10) Patent No.: US 9,629,199 B2
(45) Date of Patent: Apr. 18, 2017

(54) DEVICES AND METHODS FOR PROTOCOL MODE SWITCHING

(71) Applicant: SONY CORPORATION, Tokyo (JP)

(72) Inventors: Peter Karlsson, Lund (SE); Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 99 days.

(21) Appl. No.: 14/398,941

(22) PCT Filed: Oct. 11, 2013

(86) PCT No.: PCT/IB2013/002267
§ 371 (c)(1),
(2) Date: Nov. 4, 2014

(87) PCT Pub. No.: WO2015/052549
PCT Pub. Date: Apr. 16, 2015

(65) Prior Publication Data
US 2016/0014841 A1      Jan. 14, 2016

(51) Int. Cl.
*H04W 76/04* (2009.01)
*H04W 52/28* (2009.01)
(Continued)

(52) U.S. Cl.
CPC ....... *H04W 76/046* (2013.01); *H04W 52/028* (2013.01); *H04W 52/28* (2013.01);
(Continued)

(58) Field of Classification Search
None
See application file for complete search history.

(56) References Cited

U.S. PATENT DOCUMENTS

2010/0322126 A1* 12/2010 Krishnaswamy ..... H04W 48/16
                                                          370/311
2012/0028670 A1*  2/2012 Lim .................. H04W 52/0261
                                                          455/522

(Continued)

FOREIGN PATENT DOCUMENTS

EP    2 114 108 A1    11/2009
EP    2 410 775 A1     1/2012

OTHER PUBLICATIONS

European Telecommunications Standards Institute, "Universal Mobile Telecommunications System (UMTS); Radio Resource Control (RRC); Protocol specification (3GPP TS 25.331 version 11.5.0 Release 11)," Apr. 2013, 2094 pages.

(Continued)

Primary Examiner — Robert C Scheibel
(74) Attorney, Agent, or Firm — Harrity & Harrity, LLP

(57) ABSTRACT

A mobile terminal (20) comprises a wireless interface (21) for communication with a cellular communication network (10). A logic (27) is configured to control the wireless interface (21) to perform a mode switching signalling to cause activation of a protocol mode selected from a plurality of protocol modes for communicating over the wireless interface (21). The logic (27) is configured to selectively activate or deactivate at least one signal processing unit (24, 25) as a function of the selected protocol mode. The at least one signal processing unit (24, 25) is configured to process data received or transmitted via the wireless interface (21).

20 Claims, 5 Drawing Sheets

(51) Int. Cl.
*H04W 52/02* (2009.01)
*H04W 48/18* (2009.01)
*H04W 88/06* (2009.01)

(52) U.S. Cl.
CPC .......... *H04W 76/048* (2013.01); *H04W 48/18* (2013.01); *H04W 88/06* (2013.01)

(56) References Cited

U.S. PATENT DOCUMENTS

| | | | | |
|---|---|---|---|---|
| 2013/0016632 A1* | 1/2013 | Mujtaba | ............... | H04B 7/0608 370/275 |
| 2013/0210415 A1* | 8/2013 | Mathias | ................ | H04W 48/18 455/418 |
| 2013/0324122 A1* | 12/2013 | Lee | ..................... | H04W 52/028 455/435.1 |
| 2014/0155117 A1* | 6/2014 | Xia | ................... | H04W 52/0261 455/522 |
| 2014/0354483 A1* | 12/2014 | Azad | ...................... | H01Q 1/243 343/700 MS |

OTHER PUBLICATIONS

European Telecommunications Standards Institute, "Universal Mobile Telecommunications System (UMTS); Radio Resource Control (RRC); Protocol specification (3GPP TS 25.331 version 11.7.0 Release 11)," Oct. 2013, 2102 pages.
European Telecommunications Standards Institute, "LTE; Evolved Universal Terrestrial Radio Access (E-UTRA); Radio Resource Control (RRC); Protocol specification (3GPP TS 36.331 version 11.5.0 Release 11)," Sep. 2013, 351 pages.
International Search Report and Written Opinion for PCT/IB2013/002267, Jul. 11, 2014, 10 pages.

* cited by examiner

DEVICES AND METHODS FOR PROTOCOL MODE SWITCHING

FIELD OF THE INVENTION

Embodiments of the invention relate to wireless communication. Embodiments of the invention relate in particular to a mobile terminal configured for communication with a cellular communication network, to a communication system and to methods performed by such devices in which power consumption of the mobile terminal is controlled.

BACKGROUND OF THE INVENTION

With increasing popularity of mobile voice and data communication, there is an ever increasing demand for high-speed data communication. Modern mobile terminals of a communication network, e.g. smartphones, have advanced processing capabilities. The mobile terminals can run a wide variety of applications. These applications include social networks, e-mail services, update clients such as news update centers or weather forecasts, without being limited thereto.

For battery powered terminals, power consumption is of significant importance in order to increase battery lifetime. For certain use cases, the total battery lifetime requirements may be challenging to meet. One exemplary scenario which imposes demanding battery lifetime requirements is machine-to-machine (M2M) communication.

To reduce modem power consumption, the mobile terminal may be set to different states. For illustration, 3GPP specification TS 25.331 V11.5.0 (2013-03) entitled "3rd Generation Partnership Project; Technical Specification Group Radio Access Network; Radio Resource Control (RRC); Protocol specification (Release 11)" defines different RRC states in section 7.1. The mobile terminal may enter some of these states autonomously, e.g. when a timer expires. Traditionally, the various parameters which determine the RRC state of the mobile terminal or transitions between these states are controlled by a node of the communication network. These techniques may still not be adequate by themselves to address the power consumption problems and to meet the battery lifetime requirements of some use cases, e.g., M2M communication. For illustration, the mobile terminal may be caused to frequently make a transition from an idle mode in which it is RRC disconnected to an RRC connected mode, even when data rates are low and/or latency is large. The resulting processing activity reduces battery lifetime.

BRIEF SUMMARY OF THE INVENTION

There is a continued need in the art for devices and methods which mitigate the problems associated with modem power consumption.

According to embodiments, active hardware switching may be combined with different protocol modes in order to reduce power consumption and increase battery lifetime. A mobile terminal may be configured to communication with the cellular communication network using a plurality of different protocol modes. One of the protocol modes may be selected, e.g. in accordance with the applications that are being executed by the terminal or depending on whether machine-to-machine type communication is to be performed. A hardware block may be selectively activated as a function of the selected protocol mode, such that the activated hardware block is tailored to the requirements of the protocol mode both as regards its processing capabilities and as regards a reduced power consumption.

The different protocol modes may be distinguished in terms of data rates and/or latencies. The different protocol modes may be associated with different parameter setting. Parameter settings associated with a protocol mode may respectively define parameters of layer 1, layer 2, and/or layer 3 signalling between mobile terminal and the cellular communication network.

A mobile terminal according to an embodiment comprises a wireless interface for communication with a cellular communication network and a logic. The logic is configured to control the wireless interface to perform a mode switching signalling to cause activation of a protocol mode which is selected from a plurality of protocol modes for communicating over the wireless interface. The logic is configured to selectively activate or deactivate at least one signal processing unit as a function of the selected protocol mode. The at least one signal processing unit is configured to process data received or transmitted via the wireless interface.

The mobile terminal may comprise a first signal processing unit connected to the wireless interface and a second signal processing unit connected to the wireless interface. The logic may be configured to activate the first signal processing unit and deactivate the second signal processing unit when a first protocol mode is selected, and to activate the second signal processing unit and deactivate the first signal processing unit when a second protocol mode is selected.

The wireless interface may comprise an antenna for transmitting and/or receiving data symbols. The first signal processing unit may be coupled to the antenna to process the data of a data symbol when the first protocol mode is selected, and the second signal processing unit may be coupled to the antenna to process the data of a data symbol when the second protocol mode is selected.

The first signal processing unit may be a first baseband unit and the second signal processing unit may be a second baseband unit different from the first baseband unit. The first signal processing unit may be a first digital baseband unit and the second signal processing unit may be a second digital baseband unit.

The first signal processing unit and the second signal processing unit may both be configured to process data symbols modulated to have a carrier frequency in the same frequency band.

The first signal processing unit may have a first power consumption and the second signal processing unit may have a second power consumption which is less than the first power consumption.

The first signal processing unit may be a first digital signal processing unit and the second signal processing unit may be a second digital signal processing unit.

The first protocol mode may have a first data rate for communication via the wireless interface and the second protocol mode may have a second data rate for communication via the wireless interface which is less than the first data rate.

The first protocol mode may have a first latency and the second protocol mode may have a second latency which is longer than the first latency.

Signals received or transmitted by the mobile terminal may have a carrier frequency in the same frequency band when the first protocol mode is activated and when the second protocol mode is activated. The antenna may receive signals having the same carrier frequency which, after demodulation, are selectively processed by the first signal processing unit or by the second processing unit, depending on whether the first protocol mode or the second protocol mode is selected.

The second protocol mode may be a Machine-to-Machine type communication mode.

The mode switching signalling may be terminal-initiated.

The logic may be configured to select the protocol mode from the plurality of protocol modes, control the wireless interface to transmit a protocol mode change request which includes an indicator for the selected protocol mode, and in response to receiving a protocol mode change response, control the wireless interface in accordance with the selected protocol mode.

The logic may be configured to determine, in response to receiving the protocol mode change response, whether the at least one signal processing unit is to be activated or deactivated.

The mode switching signalling may be network-initiated.

The logic may be configured to receive, at the wireless interface, a protocol mode change request which includes an indicator for the selected protocol mode and, in response to determining that the selected protocol mode may be activated, control the wireless interface to transmit an acknowledgment message.

The selected protocol mode and at least one other protocol mode of the plurality of protocol modes may have different parameter settings for signalling between the mobile terminal and the cellular communication network. The selected protocol mode and at least one other protocol mode of the plurality of protocol modes may have different parameter settings for layer 1, layer 2, and/or layer 3 signalling between mobile terminal and the cellular communication network.

The mobile terminal may be configured to switch between different RRC states while operating in the first protocol mode and/or while operating in the second protocol mode.

According to another embodiment, a communication system is provided which includes the mobile terminal of an embodiment and a cellular communication network.

A method of performing a transition between a plurality of protocol modes of a mobile terminal according to an embodiment comprises performing a mode switching signalling to cause activation of a protocol mode selected from a plurality of protocol modes for communicating over a wireless interface of the mobile terminal. At least one signal processing unit of the mobile terminal is selectively activated or deactivated as a function of the selected protocol mode. The at least one signal processing unit is configured to process data received or transmitted via the wireless interface.

The method may be performed by the mobile terminal according to an embodiment.

The method may comprise activating a first signal processing unit of the mobile terminal and deactivating a second signal processing unit when a first protocol mode is selected, and activating the second signal processing unit and deactivating the first signal processing unit when a second protocol mode is selected. The first and second protocol modes may both involve communication over the same wireless interface.

The method may comprise processing data of a data symbol received by an antenna by one of the first signal processing unit and the second signal processing unit, which is selected based on whether the first protocol mode or the second protocol mode is selected.

In the method, the first signal processing unit may be a first baseband unit and the second signal processing unit may be a second baseband unit different from the first baseband unit.

In the method, the first signal processing unit and the second signal processing unit may both process data symbols which have a carrier frequency in the same frequency band. The first signal processing unit and the second signal processing unit may both process data symbols which have the same carrier frequency.

In the method, the first signal processing unit may be a first digital baseband unit and the second signal processing unit may be a second digital baseband unit.

In the method, the first signal processing unit may have a first power consumption and the second signal processing unit may have a second power consumption which is less than the first power consumption.

In the method, the first signal processing unit may be a first digital signal processing unit and the second signal processing unit may be a second digital signal processing unit.

In the method, the first protocol mode may have a first data rate for communication via the wireless interface and the second protocol mode may have a second data rate for communication via the wireless interface which is less than the first data rate.

In the method, the first protocol mode may have a first latency and the second protocol mode may have a second latency which is longer than the first latency.

Signals received or transmitted by the mobile terminal may have a carrier frequency in the same frequency band when the first protocol mode is activated and when the second protocol mode is activated. The antenna may receive signals having the same carrier frequency which, after demodulation, are selectively processed by the first signal processing unit or by the second processing unit, depending on whether the first protocol mode or the second protocol mode is selected.

In the method, the second protocol mode may be a Machine-to-Machine type communication mode.

The mode switching signalling may be terminal-initiated.

The method may comprise selecting the protocol mode from the plurality of protocol modes, controlling the wireless interface to transmit a protocol mode change request which includes an indicator for the selected protocol mode, and in response to receiving a protocol mode change response, controlling the wireless interface in accordance with the selected protocol mode.

The method may comprise determining, in response to receiving the protocol mode change response, whether the at least one signal processing unit is to be activated or deactivated.

The mode switching signalling may be network-initiated.

The method may comprise receiving, at the wireless interface, a protocol mode change request which includes an indicator for the selected protocol mode and, in response to determining that the selected protocol mode is to be activated, controlling the wireless interface to transmit an acknowledgment message.

The selected protocol mode and at least one other protocol mode of the plurality of protocol modes may have different parameter settings for signalling between the mobile terminal and the cellular communication network. The selected protocol mode and at least one other protocol mode of the plurality of protocol modes may have different parameter settings for layer 1, layer 2, and/or layer 3 signalling between mobile terminal and the cellular communication network.

The method may comprise switching between different RRC states while operating in the first protocol mode and/or the second protocol mode.

In the methods and devices according to embodiments, the selected protocol mode and at least one other protocol mode of the plurality of protocol modes may have different DRX parameter settings, for example.

The different DRX parameter settings may comprise different DRX cycle lengths. Additionally or alternatively, the different DRX parameter settings may comprise different inactivity timer values. Additionally or alternatively, the different DRX parameter settings may comprise different paging cycles.

At least two protocol modes of the plurality of protocol modes may have different protocol procedures for the mobile terminal accessing the wireless network. The logic may select one of these at least two protocol mode.

At least two protocol modes of the plurality of protocol modes may have different radio parameters. At least two protocol modes of the plurality of protocol modes may have different terminal output power classes.

The mobile terminal may be user equipment. The user equipment may be configured for communication with a Long Term Evolution (LTE) network. The mobile terminal may be a mobile phone, e.g. a smartphone.

The mobile terminal may be user equipment capable of performing machine-to-machine type communication.

The mobile terminal may be a machine-to-machine (M2M) terminal. The mobile terminal may be configured to perform M2M communication via the wireless network.

Devices and methods according to embodiments allow a mobile terminal to transition to a certain protocol mode having lower power consumption than the regular, fully operative protocol mode. Hardware switching may be performed to activate a low-power signal processing unit which is specifically designed for operation under the protocol mode that is activated for reducing power consumption. Battery lifetime may be increased.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

Figure 1:
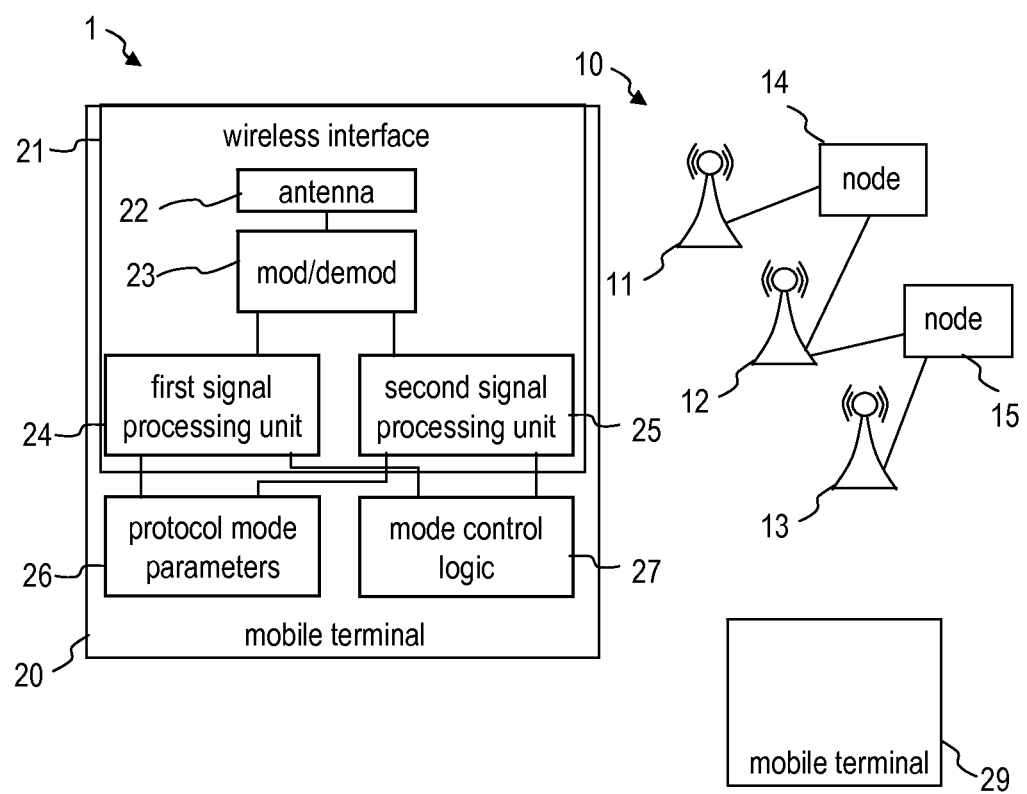
FIG. 1 is a schematic view of a communication system according to an embodiment.

FIG. 1 is a schematic view of a communication system 1 according to an embodiment. The wireless communication system 1 comprises a mobile terminal 20. The wireless communication system 1 comprises a communication network 10. The communication network 10 has a radio access network (RAN). The radio access network includes a plurality of base stations 11-13. The base stations 11-13 may be operatively coupled to other nodes 14, 15 which may be provided in the radio access network or in a core network (CN) of the communication network 10. The specific configuration of the communication network 10, of the base stations 11-13 and of the nodes 14, 15 depends on the communication standard. For illustration, the communication network 10 may be a Global System for Mobile Communications (GSM) network. In this case, the RAN is a GSM EDGE Radio Access Network (GERAN), with the nodes 14, 15 being base station controllers. The communication network 10 may be a Universal Mobile Telecommunications System (UMTS) network. In this case, the RAN is a UMTS Terrestrial Radio Access Network (UTRAN), with the base stations 11-13 respectively being a NodeB and the nodes 14, 15 being a Radio Network Controller (RNC). The communication network 10 may be a Long Term Evolution (LTE) network. In this case, the RAN is an evolved UTRAN (eUTRAN), with the base stations 11-13 respectively being an evolved Node B (eNodeB), and the nodes 14, 15 being a Mobility Management Entity (MME) and/or Serving Gateway (S-GW) in the core network.

The mobile terminal 20 has a wireless interface 21 or several wireless interfaces 21 to communicate with at least one radio access network (RAN). The wireless interface(s) 21 comprises an antenna 22 and a modem circuit 23. The modem circuit 23 may perform at least some functions of the modulation and demodulation, respectively, required for the respective communication standard used by the mobile terminal 20. The mobile terminal 20 may be configured for communication with the RAN according to the Radio Resource Control, RRC, protocol. For illustration, the mobile terminal 20 may be configured to communicate with the RAN in accordance with 3GPP specification TS 25.331. The mobile terminal 20 may be configured for radio communication with the RAN in accordance with 3GPP specification TS 25.331 V11.7.0 (2013-09) entitled "3rd Generation Partnership Project; Technical Specification Group Radio Access Network; Radio Resource Control (RRC); Protocol specification (Release 11)". Alternatively or additionally, the mobile terminal 20 may be configured to communicate with the RAN in accordance with 3GPP specification TS 36.331. The mobile terminal 20 may be configured for radio communication with the RAN in accordance with 3GPP specification TS 36.331 V11.5.0 (2013-09) entitled "3rd Generation Partnership Project; Technical Specification Group Radio Access Network; Evolved Universal Terrestrial Radio Access (E-UTRA); Radio Resource Control (RRC); Protocol specification (Release 11)".

The mobile terminal 20 may be configured for communication over the same wireless interface 21 in accordance with different protocol modes. The different protocol modes may use the same frequency band, but may be associated with different data rates and/or latencies, for example. The different protocol modes may be defined by different parameter sets for layer 1 signalling, layer 2 signalling, and/or layer 3 signalling. The different protocol modes may include at least a first protocol mode and a second protocol mode.

The second protocol mode may have a data rate which is less than a data rate of the first protocol mode when transmitting and/or receiving data. The second protocol mode may have a latency which is less than a latency of the first protocol mode when transmitting and/or receiving data. More than two protocol modes may be defined.

The mobile terminal 20 includes a first signal processing unit 24 and a second signal processing unit 25. The first signal processing unit 24 may be configured to process data symbols received at the wireless interface 21. The first signal processing unit 24 may be a first digital signal processing unit. The first signal processing unit 24 may have processing capabilities designed to allow the first signal processing unit 24 to process the data required for communication in the first protocol mode. The first signal processing unit 24 may have processing capabilities designed to allow the first signal processing unit 24 to process the data required for communication in both the first protocol mode and the second protocol mode.

The second signal processing unit 25 may have processing capabilities designed to allow the second signal processing unit 25 to process the data required for communication in the second protocol mode. The second signal processing unit 25 may have processing capabilities designed to allow the second signal processing unit 24 to process the data required for communication in the second protocol mode, but which do not allow the second processing unit to perform the processing required for transmitting and/or receiving data in the first protocol mode.

The first signal processing unit 24 and the second signal processing unit 25 may be different baseband units, for example.

The first signal processing unit 24 and the second signal processing unit 25 may respectively perform at least some of the functions required for processing data to be transmitted and/or for processing received data symbols. The first signal processing unit 24 and the second signal processing unit 25 may perform functions of error detection, error correction, interleaving, deinterleaving, organizing data to be transmitted into data symbols, combining data from several received data symbols, etc. The first signal processing unit 24 and the second signal processing unit 25 may respectively be a microprocessor, a processor, a microcontroller, a controller, an application specific integrated circuit (ASIC), a digital signal processor, or a combination of such entities.

The first signal processing unit 24 and the second signal processing unit 25 may have different power consumption. A power consumption of the first signal processing unit 24 when the first signal processing unit 24 processes data received or transmitted in the first protocol mode may be greater than a power consumption of the second signal processing unit 25 when the second signal processing unit 25 processes data received or transmitted in the second protocol mode. A power consumption of the first signal processing unit 24 when the first signal processing unit 24 processes data received or transmitted in the second protocol mode may be greater than a power consumption of the second signal processing unit 25 when the second signal processing unit 25 processes data received or transmitted in the second protocol mode. The configuration of the second signal processing unit 25 may be tailored to the processing requirements of the second protocol mode, while providing a reduction in power consumption compared to the first signal processing unit 24.

The mobile terminal 20 includes a mode control logic 27. The mode control logic may be integrated with one of the first and second signal processing units and/or a processor of the mobile terminal 20. The mode control logic 27 is operative to selectively deactivate one of the first signal processing unit 24 and the second signal processing unit 25. Deactivation may occur by reducing power supply to the respective signal processing unit, by providing a control signal to the respective signal processing unit which causes it to automatically enter a sleep mode or other low-protocol mode, etc., for example.

The act of activating one signal processing unit for processing data of data symbols received or transmitted over the wireless interface while deactivating at least one other signal processing unit will be referred to as "hardware switching" herein.

The mode control logic 27 may be operative to ensure that one of the first signal processing unit 24 and the second signal processing unit 25 remains activated for processing data of transmitted or received data symbols. The mode control logic 27 may be configured to select the one of the signal processing units which is switched on for data processing depending on the protocol mode which is selected for communication over the wireless interface 21 and, optionally, depending on additional criteria.

The mode control logic 27 is configured to perform a hardware switching in accordance with a selected protocol mode. This can be done in various ways. The mode control logic 27 may be configured to deactivate the first signal processing unit 24 and to activate the second signal processing unit 25 when the second protocol mode is selected. The mode control logic 27 may be configured to perform additional processing to determine whether hardware switching is to be performed. For illustration, the mode control logic 27 may analyse one or several of available battery power, time since activation of the second protocol mode, an operating state of a display of the mobile terminal, etc. to determine whether the second signal processing unit 25 shall be activated and the first signal processing unit 24 shall be stopped from processing data received or transmitted in the second protocol mode.

The decision on which protocol mode is a suitable protocol mode may also be made by the mode control logic. The decision may take into account which applications are executed on the mobile terminal 20. For illustration, when an e-mail application is being executed by the mobile terminal 20, the mode control logic 27 may select a protocol mode which allows data to be transferred to the mobile terminal 20 more frequently than if only a news update service or weather forecast application are executed.

The mode control logic 27 may determine an expected data traffic in dependence on the applications which are executed on the mobile terminal 20. The mode control logic 27 may perform hardware switching in dependence on the applications which are executed on the mobile terminal 20. For illustration, the mode control logic 27 may determine whether a machine-to-machine (M2M) type communication is to be performed over the wireless interface 21. If a M2M type communication is to be performed, communication may be performed according to a second protocol mode which may be distinguished from the normal communication with the RAN in terms of data rates, latencies, or other parameters defining the transmission over the air interface at layer 1, layer 2, or layer 3.

The protocol modes may each have a set of protocol mode parameters 26 which defines operation in the respective protocol mode. The protocol mode parameters 26 may be stored in the mobile terminal 20. The protocol mode parameters 26 may define how parameters or functionalities in a physical layer are defined. The protocol mode parameters 26 may define parameters for the physical layer of the air interface between the mobile terminal 20 and the communication network 10. Alternatively or additionally, the protocol mode parameters 26 may be parameters for layer 2 and/or layer 3 signalling between the mobile terminal 20 and the communication network 10.

The specific definition of the various protocol modes and the respective parameters may depend on the configuration of the mobile terminal 20. For illustration, for a mobile terminal which is a mobile phone, the different protocol modes may correspond to definitions of different DRX cycle lengths and/or different paging cycles when the mobile terminal is in an RRC disconnected state while operating in the respective mode. For further illustration, the different protocol modes may correspond to different output power classes of the mobile terminal 20. For further illustration, at least one of the protocol modes may correspond to M2M communication.

In several or in all of the protocol modes, the mobile terminal 20 may be configured to make transitions between an idle state in which the mobile terminal 20 is in an RRC disconnected state and an RRC connected state.

Additionally or alternatively, the selected protocol mode may add one or more additional DRX cycles. A protocol mode could for example add a long DRX level, in addition to a standard idle state DRX, to the idle RRC state.

Additionally or alternatively, the selected protocol mode may define a different protocol procedure for the mobile terminal accessing the wireless network.

Additionally or alternatively, the selected protocol mode may define different radio parameters, e.g. one or several different terminal output power classes and/or may limit the transmission/reception to half duplex operation.

Additionally or alternatively, the selected protocol mode may define different mobility management procedures. The selected protocol mode may limit or remove cell change possibilities to reduce required measurements to be performed in the mobile terminal.

Irrespective of the specific implementation of the different protocol modes, the selection of a suitable protocol mode may be terminal-initiated or may be network-initiated. The decision on whether hardware switching is to be performed in response to a protocol mode switching may be performed by the mobile terminal 20, without requiring any further signalling with the mobile communication network.

For terminal-initiated protocol mode selection, the mode control logic 27 of the mobile terminal 20 may monitor applications which are executed by the mobile terminal 20 and/or other operation conditions of the mobile terminal 20. The mode control logic 27 may determine whether a different protocol mode shall be activated to reduce power consumption. In response to determining that there is a more suitable protocol mode, the mode control logic 27 may initiate a mode switching signalling. A signalling for terminal-initiated protocol mode switching according to an embodiment will be explained in more detail with reference to FIG. 3 and FIG. 4. In response to receiving confirmation from the RAN 10 that the protocol mode selected by the mode control logic 27 may be activated, the mode control logic 27 may control the wireless interface 21 to start communication in accordance with the selected protocol mode. Hardware switching may be performed, possibly after checking additional criteria for hardware switching.

For network-initiated protocol mode selection, the mobile terminal 20 may receive a request from the RAN 10 to change communication over the air interface to a selected protocol mode. The protocol mode may be selected by a node of the RAN 10. The mode control logic 27 may determine whether the selected protocol mode can be accommodated by the mobile terminal 20. A signalling for network-initiated protocol mode switching according to an embodiment will be explained in more detail with reference to FIG. 5. In response to determining that the selected protocol mode may be activated, the mode control logic 27 may control the wireless interface 21 to start communication in accordance with the selected protocol mode. Hardware switching may be performed, possibly after checking additional criteria for hardware switching.

The wireless communication system 1 may include several mobile terminals 20, 29 which are configured as explained with reference to the mobile terminal 20.

Figure 2:
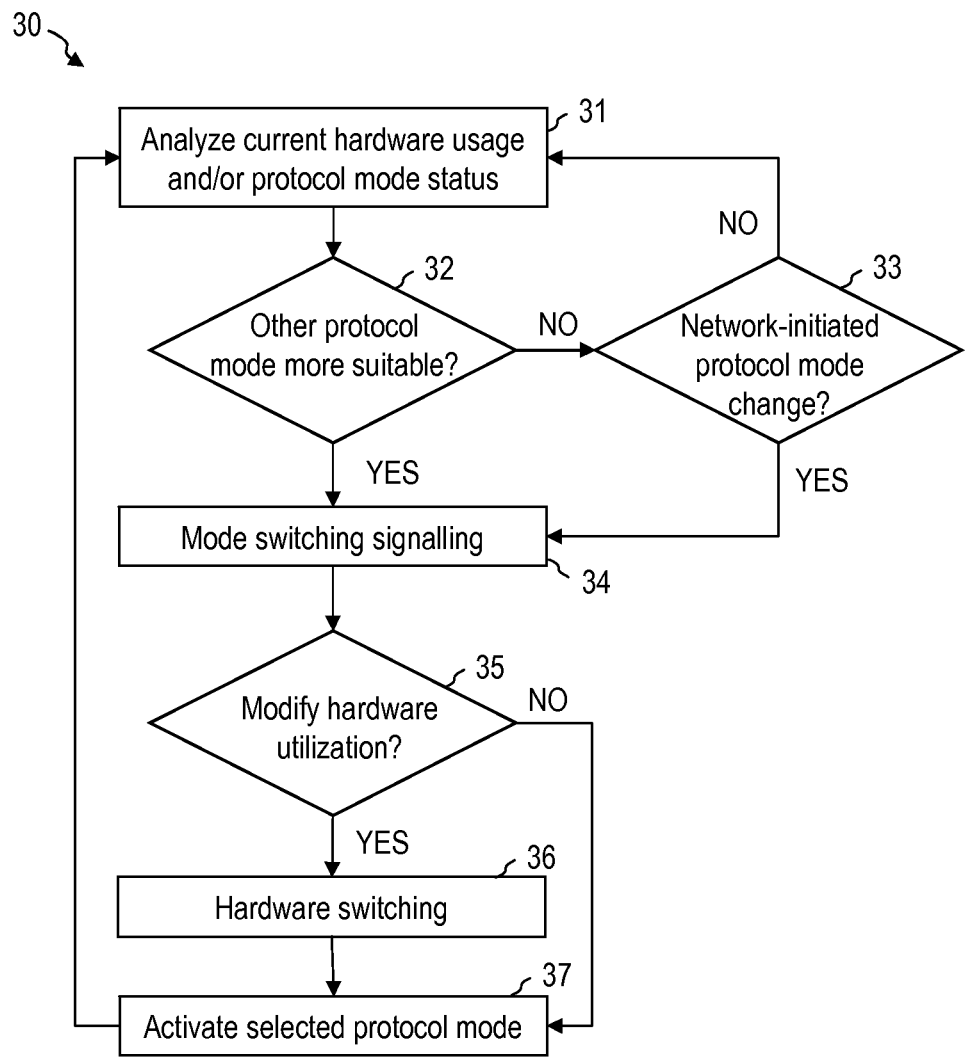
FIG. 2 is a flow chart of a method according to an embodiment.

FIG. 2 is a flow chart of a method 30 according to an embodiment. The method 30 may be automatically performed by a mobile terminal according to an embodiment.

At 31, current hardware usage requirements and/or an active protocol mode may be analyzed. For illustration, the analysis at step 31 may include determining whether a display of the mobile terminal is switched off. Alternatively or additionally, the analysis at step 31 may include determining whether communication is performed over a wireless interface with a low data rate and/or long latency, as may be the case for M2M communication or in a RRC idle state having a long DRC cycle length. Alternatively or additionally, the applications that are being executed by the mobile terminal and the associated data traffic may be analyzed at step 31.

At 32, it is determined whether another protocol mode may be more suitable. The determining at step 32 may include determining a protocol mode which would lead to a lower power consumption than the protocol mode that is presently active, based on the analysis performed at step 31. The determining at step 32 may include determining the protocol mode having lowest power consumption among the protocol modes which can accommodate the present usage of the mobile terminal. If it is determined at step 31 that there is a more suitable protocol mode, the method proceeds to step 34. If the mobile terminal does not identify a more suitable protocol mode, the method may proceed to step 33.

At 33, the mobile terminal may monitor whether a network-initiated request for changing the protocol mode is received. If no network-initiated request for changing the protocol mode is received, the method may return to step 31. If a network-initiated request for changing the protocol mode is received, the method may proceed to step 34.

At 34, the mobile terminal performs the signalling which is required for changing the protocol mode. For a terminal-initiated protocol mode switching, the mobile terminal may transmit a request to the communication network. The request may include an identifier for the selected protocol mode. The mobile terminal may monitor whether the communication network accepts or rejects the protocol mode switching requested by the mobile terminal.

For a network-initiated protocol mode switching, the mobile terminal may verify, at step 34, whether the mobile terminal can accommodate the selected protocol mode. The determination may be performed based on the results of the analysis performed at step 31. The mobile terminal may transmit, at step 34, a message to the cellular communication network which either indicates that the requested switching to the selected protocol mode is accepted or that the switching to the selected protocol mode is rejected.

At 35, the mobile terminal determines whether the hardware utilization is to be modified. The determining at step 35 may include determining which one of several signal processing units for processing data of received and/or transmitted data symbols can perform the processing required for the selected protocol mode, while having the lowest power consumption among the available signal processing units which can perform the processing required for the selected protocol mode.

The determining at step 35 may take additional criteria into consideration. For illustration, a decision on whether the hardware utilization is to be modified may take into account the applications that are being executed on the mobile terminal and, optionally, the data traffic associated with the applications. For further illustration, the decision on whether the hardware utilization is to be modified may take into account the status of other hardware units of the mobile terminal which are not located in the signal processing path of received and transmitted signals, e.g. whether the display is switched off. For further illustration, the decision on whether the hardware utilization is to be modified may take into account for how long the mobile terminal typically remains operative in the selected protocol mode. The decision at step 35 may take into account whether the anticipated reduction in power consumption when hardware switching is performed exceeds a threshold. The decision at step 35 may take into account whether the anticipated reduction in power consumption when hardware switching is performed outweighs the processing delays and/or temporary increase of power consumption during hardware switching.

If it is determined, at step 35, that no hardware switching is to be performed, the method proceeds to step 37. If it is determined at step 35 that hardware switching is to be performed, the method proceeds to step 36.

At 36, hardware switching may be performed. The hardware switching may include activating a signal processing unit that is presently not active for processing data and deactivating another signal processing unit that has been used for processing data. For illustration, if a second protocol mode is to be activated, the hardware switching at step 36 may include deactivating a first signal processing unit and activating the second signal processing unit. If a first protocol mode is to be activated, the hardware switching at step 36 may include deactivating a second signal processing unit and activating the first signal processing unit. Deactivating one of the first and second signal processing units may include any one, or any combination of, controlling a demultiplexer such that data are no longer provided to the respective signal processing unit, reducing a power supply provided to the respective signal processing unit, or providing a control signal to the respective signal processing unit to cause it to enter a sleep state, for example. Activating one of the first and second signal processing units may include any one, or any combination of, controlling a demultiplexer such that data are provided to the respective signal processing unit, increasing a power supply provided to the respective signal processing unit, or providing a control signal to the respective signal processing unit to cause it to enter a fully operational state, for example.

At 37, the selected protocol mode may be activated. The wireless interface may be controlled to transmit and/or receive data in accordance with the selected protocol mode.

The method may then return to step 31.

Figure 3:
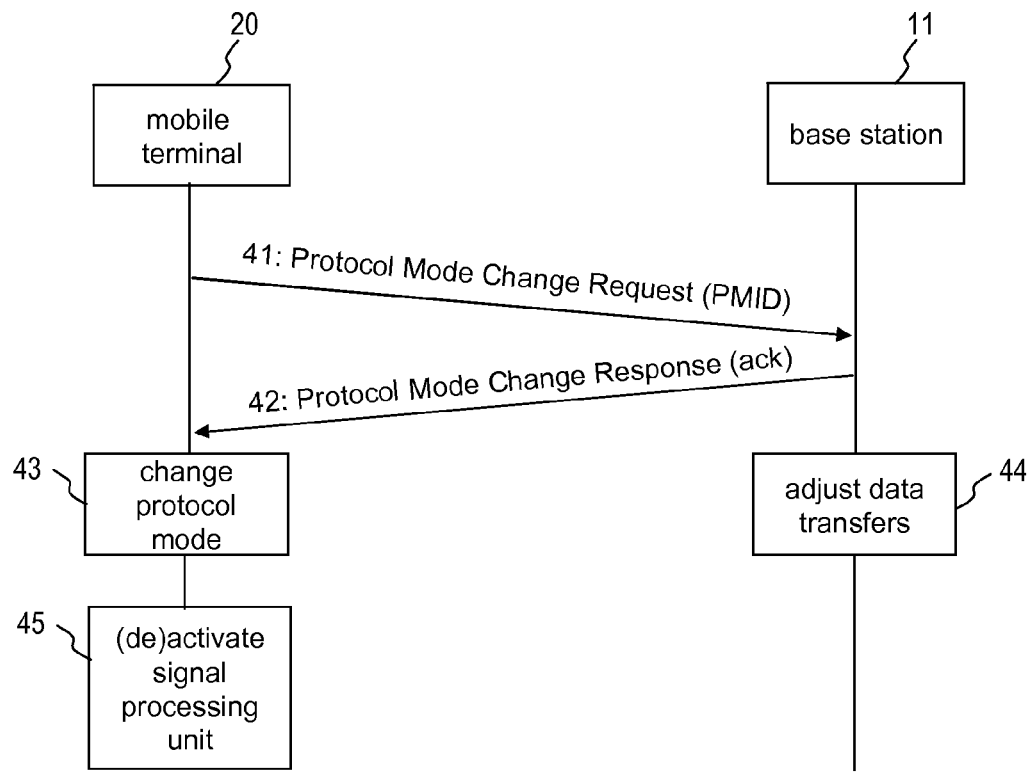
FIG. 3, FIG. 4 and FIG. 5 are diagrams illustrating operation of a mobile terminal and a radio access network node according to an embodiment.

FIG. 3 shows a signalling between the mobile terminal 20 and the base station 11 of the communication network according to an embodiment, which may be used to implement a mode switching signalling. The signalling may be used by the mobile terminal or the method of an embodiment to implement a terminal-initiated mode switching signalling.

The mobile terminal 20 transmits a message 41 which is a protocol mode change request. The protocol mode change request includes an indicator PMID for the selected protocol mode. The indicator PMID may be contained in two indicator bits or in three indicator bits of the message 41, for example. Up to four or up to eight different protocol modes may be defined thereby.

The cellular communication network determines whether the mobile terminal 20 may switch its protocol mode to the selected protocol mode indicated by the indicator PMID in the message 41. The determining may include determining whether the data transmission speeds and/or network load meet target conditions even when the mobile terminal 20 switches to the selected protocol mode indicated by the indicator PMID.

If the base station 11 or another RAN node determines that the mobile terminal 20 may switch its protocol mode to the selected protocol mode, it transmits a positive acknowledgement (ack) message 42 to the mobile terminal 20. The message 42 is a protocol mode change response which accepts the protocol mode switching requested by the mobile terminal.

At 43, in response to receiving the protocol mode change response which accepts the protocol mode switching, the mobile terminal 20 changes the protocol mode to the protocol mode indicated in the message 41. The change may occur at a predefined time or may be triggered by a triggering event. The change may occur selectively in dependence on whether the positive acknowledgment message 42 was received.

At 44, the base station 11 and/or another node in the RAN may adjust data transfers to the mobile terminal 20 in accordance with the indicator for the protocol mode included in the protocol mode change request message 41. This may limit signalling towards the mobile terminal 20 if a protocol mode with low power consumption is selected. The data rates and/or latencies may be adjusted in accordance with the selected protocol mode. The adjustment may be made at layer 1 of the signalling between the base station 11 and the mobile terminals 20. The adjustment may be made at layer 2 and/or layer 3 of the signalling between the base station 11 and the mobile terminals 20.

At 45, the mobile terminal 20 may perform a hardware switching. A signal processing unit may be activated which is adapted for data processing under the selected protocol mode while another signal processing unit may be deactivated which is not specifically adapted for data processing under the selected protocol mode.

Figure 4:
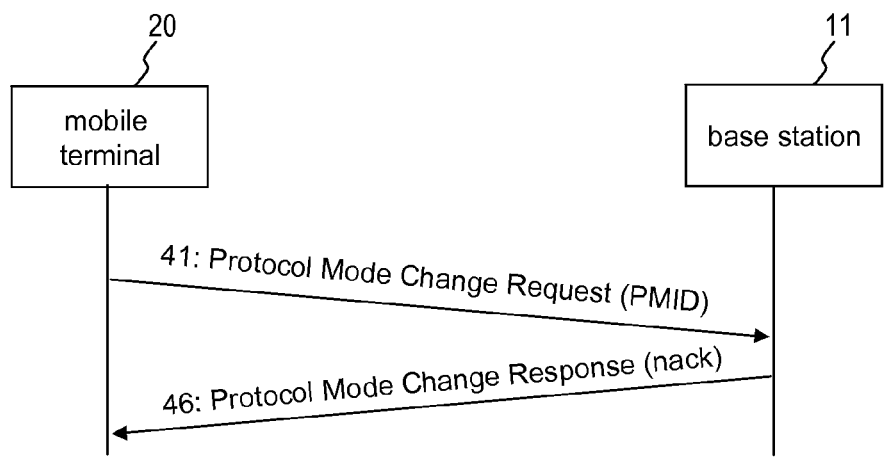

FIG. 4 illustrates the signalling when the base station 11 or another RAN node determines that the mobile terminal 20 may not switch its protocol mode to the selected protocol mode. The base station 11 or another RAN node transmits a negative acknowledgement (nack) message 26 to the mobile terminal 20. The message 26 is a protocol mode change response which rejects the protocol mode switching requested by the mobile terminal.

In response to receiving the protocol mode change response which rejects the protocol mode switching, the mobile terminal 20 does not change its protocol mode. The mobile terminal 20 may, however, subsequently transmit a new protocol mode change request. The base station 11 does not adjust the signalling with the mobile terminal at layer 1, layer 2 and/or layer 3 because no protocol mode switching is performed.

Even when no protocol mode switching is performed, e.g. in the scenario illustrated in FIG. 4, the mobile terminal 20 may still determine whether hardware switching is to be performed. For illustration, when a second protocol mode with lower power consumption is activated, the mobile terminal 20 may delay the hardware switching which involves the activation of the second signal processing unit until a certain time has elapsed from the protocol mode switching or other criteria have been fulfilled. For illustration, when the mobile terminal 20 transmits the protocol mode change request 41 requesting that the first protocol mode may be activated and the communication network rejects the request, receipt of the message 46 may trigger activation of the second signal processing unit and deactivation of the first signal processing unit.

Figure 5:
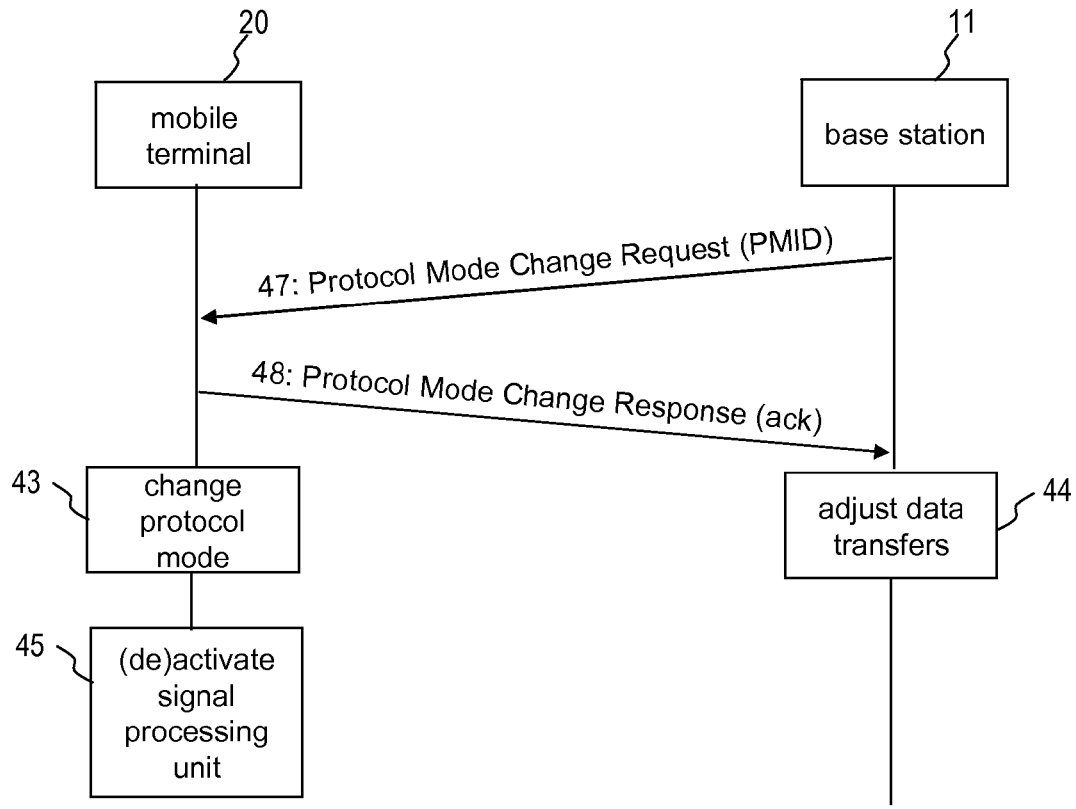

In addition or alternatively to the mobile terminal initiated protocol mode switching explained with reference to FIG. 3 and FIG. 4 above, the mobile terminal and RAN may also be configured for a RAN-initiated protocol mode switching. In this case, the RAN may transmit a protocol mode change request which includes an identifier for one protocol mode of the plurality of protocol modes. This is illustrated in FIG. 5.

The base station 11 or another RAN node transmits a message 47 which is a protocol mode change request. The protocol mode change request includes an indicator for a protocol mode selected by the base station 11 or another RAN node.

The mobile terminal 20 determines whether the protocol mode switching to the selected protocol mode identified by the message 47 can be made. The mobile terminal 20 may determine whether required data transmission speeds and/or transmission delays could be attained when the mobile terminal 20 switches to the protocol mode indicated by the message 47.

If the mobile terminal 20 accepts the requested protocol mode switching, it transmits an acknowledgment message 48. The mobile terminal 20 subsequently switches to the further protocol mode at 43.

At 45, the mobile terminal 20 may perform a hardware switching. A signal processing unit may be activated which is adapted for data processing under the selected protocol mode, while another signal processing unit may be deactivated which is not specifically adapted for data processing under the selected protocol mode.

If the mobile terminal 20 rejects the requested protocol mode switching, it transmits a negative acknowledgment message (not shown in FIG. 5).

The transmission of messages and the signalling performed after the protocol mode change has taken effect in both the mobile terminal and the RAN may utilize the parameters of the selected protocol mode. For illustration, the protocol modes may be distinguished in the parameters of the physical layer of the radio interface which are respectively used, for example. The mobile terminal 20 may still switch between the RRC disconnected state and the RRC connected state while it remains in one and the same protocol mode.

The signalling explained with reference to FIG. 3, FIG. 4, and FIG. 5 may be performed during an RRC Connection Establishment procedure or during an RRC Connection Reconfiguration procedure, for example.

Figure 6:
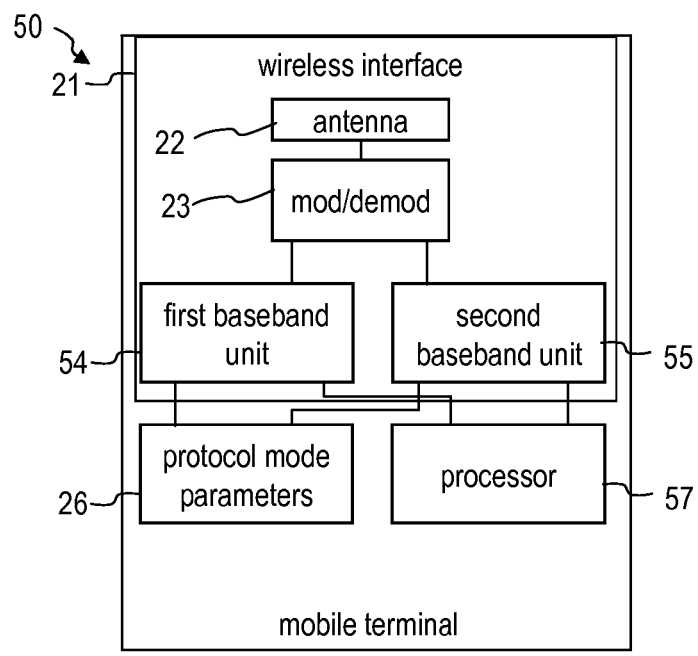
FIG. 6 is a block diagram representation of functional units of a mobile terminal according to an embodiment.

FIG. 6 is a representation of a mobile terminal 50 according to an embodiment. The mobile terminal 50 includes a first signal processing unit which is implemented as a first baseband unit 54. The mobile terminal 50 includes a second signal processing unit which is implemented as a second baseband unit 55. A processor 57 of the mobile terminal 50 is operative to perform a hardware switching. The one of the first baseband unit 54 and the second baseband unit 55 which is specifically adapted for operation under the selected protocol mode may be activated while the other one of the baseband units 54, 55 may be deactivated.

In operation of the mobile terminal 50, when a first protocol mode is activated, the data processing will generally be made by the first baseband unit 54. When a second protocol mode is activated, the data processing will generally be made by the second baseband unit 55.

The processor 57 may be configured to select a protocol mode from a plurality of supported protocol modes, e.g. by analyzing the operation of the mobile terminal 50 and/or by processing a protocol mode change request received from the RAN in a network-initiated mode switching signalling. The processor 57 may be configured to determine whether a switching from one of the baseband units 54, 55 to the other one of the baseband units 54, 55 shall be performed, as explained for the mode control logic 27 of the mobile terminal 20.

The processor 57 may be configured to execute applications running on the mobile terminal 50. The processor 57 may be configured to perform a combined protocol mode switching and hardware switching as a function of the applications executed by the processor 57. The processor 57 may be configured to perform a combined protocol mode switching and hardware switching as a function of the data traffic associated with the applications executed by the processor 57.

The first baseband unit 54 and the second baseband unit 55 may be configured such that, both in the first protocol mode and in the second protocol mode, data symbols are transmitted or received over the same air interface. The modulated signals may have a carrier frequency in the same frequency band in the first and second protocol modes.

In one implementation of a mobile terminal 50 according to an embodiment, the second baseband unit 55 may be configured for the data rates and latencies of M2M communication. The M2M communication may be performed over the same interface and in the same frequency band as the conventional voice or data communication with the communication network. The data processing capabilities of the second baseband unit 55 may be less than those of the first baseband unit 54, making the second baseband unit 55 suitable for processing signals in M2M communication mode.

Figure 7:
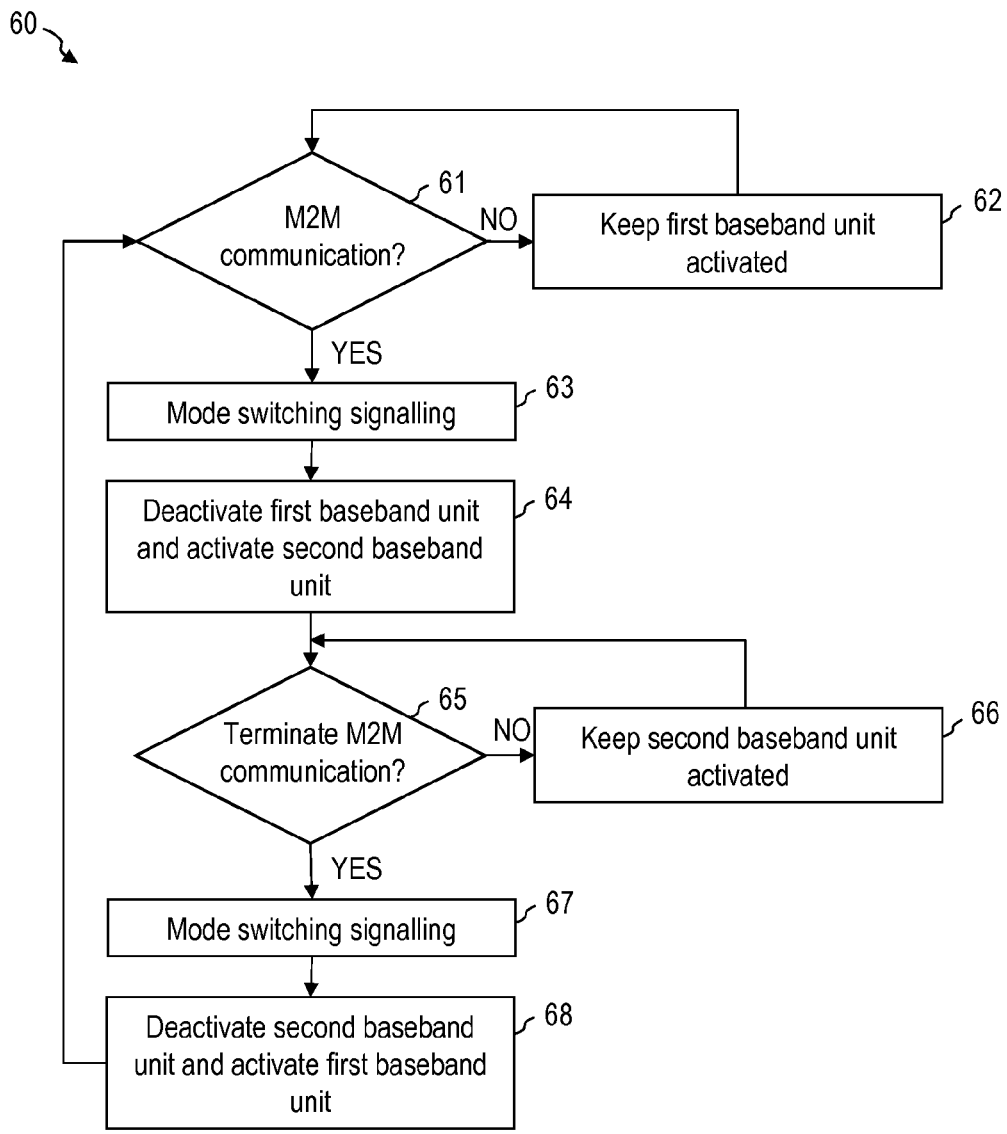
FIG. 7 is a flow chart of a method according to an embodiment.

FIG. 7 is a flow chart of a method 60 according to an embodiment. The method 60 may be used when the mobile terminal supports a protocol mode for M2M communication over the air interface of the wireless communication system. The mobile terminal has a first baseband unit 54 for normal, fully operative communication with the RAN of the wireless communication system. The mobile terminal has a second baseband unit 55 for processing data when M2M communication is performed.

At 61, it is determined whether M2M communication is to be performed. The determining at step 61 may include analyzing the applications executed by a processor of the mobile terminal. The determining at step 61 may include analyzing whether the executed applications utilize M2M communication. The determining at step 61 may include analyzing historical data traffic. If no M2M communication is to be performed, the first baseband unit is kept activated at step 62 and the method may return to step 61. If it is determined at step 61 that M2M communication is to be performed, the method proceeds to step 63.

At 63, mode switching signalling may be performed. The mode switching signalling may be a terminal-initiated signalling in which the mobile terminal informs the RAN of the protocol mode for M2M communication which is to be used. The RAN of the cellular communication network adjusts the signalling towards the mobile terminal in accordance with the parameters of the M2M communication. For illustration, DRX cycle lengths and/or paging cycles may be increased, data rates may be decreased, and/or latencies may be increased when the mobile terminal uses the protocol mode for M2M communication.

At step 64, the first baseband unit may be deactivated and the second baseband unit may be activated. While the first baseband unit may be configured to process the data of data symbols transmitted or received in the protocol mode for M2M communication, the hardware switching at step 64 may further reduce power consumption.

At 65, it is determined whether the protocol mode for M2M communication is to be terminated. The determining at step 65 may include analyzing the applications executed by a processor of the mobile terminal. The determining at step 65 may include analyzing whether at least one of the executed applications is incapable of using M2M communication. The determining at step 65 may include analyzing historical data traffic. If the protocol mode for M2M communication is to be terminated, the second baseband unit is kept activated at step 66, and the first baseband unit may be kept deactivated, and the method may return to step 65. If it is determined at step 65 that the protocol mode for M2M communication is to be terminated, the method proceeds to step 67.

At 67, mode switching signalling may be performed. The mode switching signalling may be a terminal-initiated signalling in which the mobile terminal informs the RAN of the protocol mode which is to be used when the protocol mode for M2M communication is terminated. The RAN of the cellular communication network adjusts the signalling towards the mobile terminal in accordance with the parameters of the selected protocol mode. For illustration, DRX cycle lengths and/or paging cycles may be decreased, data rates may be increased, and/or latencies may be decreased when the mobile terminal terminates the protocol mode for M2M communication.

At step 68, the second baseband unit may be deactivated and the first baseband unit may be activated.

The method may return to step 61.

Various effects are attained by the devices and methods according to embodiments. For illustration, a specific protocol mode may be used to efficiently control the incoming and/our outgoing data traffic of the mobile terminal. This is combined with hardware switching. Input both from a selected protocol mode and required processing resources within the terminal may determine the hardware blocks to be used. One effect of such a technique is the ability to adaptively use different hardware for optimized resource utilization but still be able to use the same core communication protocol, e.g. the WCDMA (Wideband Code Division Multiple Access) or LTE standard. Depending on the use case it will be possible to optimize the power consumption by means of adapting the behaviour of the communication protocol to current needs and switch between the different hardware blocks, i.e. activating the different signal processing units, as required.

The different protocol modes supported by a mobile terminal according to an embodiment may have various implementations. As one example, embodiments may be implemented where the screen is switched off in a mobile phone used for mobile communication. In this occasion the amount of applications running in the terminal may be limited and the modem utilization may be limited as well by selecting a protocol mode which has lower power consumption, but also lower data rates and/or longer latency, for example. The selected protocol mode may be activated by switching the radio communication protocol parameters to reduce power consumption, i.e. to do a mode switch. The battery life may be increased further if a second signal processing unit is used in the second protocol mode, which is tailored to operate with the second protocol mode.

Alternatively or additionally, mobile terminals may be configured for M2M communication, where the requirements for battery life can present a considerable challenge. The mobile terminal can, at least during periods, enter a very low power protocol mode using a dedicated signal processing unit. Hence same standardized protocol (e.g. LTE) can be continued to be used even for M2M communication, but in a mode which requires significantly less processing and therefore prolongs battery life.

While exemplary embodiments have been described with reference to the drawings, modifications may be implemented in other embodiments. For illustration, the mobile terminal may be a mobile phone, a M2M terminal, or another mobile terminal. Further, while exemplary network technologies have been described, embodiments of the invention may be used in combination with other network technologies.

While the mobile terminal may include a first signal processing unit and a second signal processing unit, more than two signal processing units may be used. The mobile terminal may support more than two different protocol modes. The mobile terminal may support at least three protocol modes, and the mobile terminal may have at least three signal processing units tailored for operation in one of the different protocol modes. Hardware switching may include activating the signal processing unit which is specifically adapted for use with the selected protocol mode, and deactivating at least one of the other signal processing units. Hardware switching may include activating the signal processing unit which is specifically adapted for use with the selected protocol mode, and deactivating several other signal processing units which are provided for use with different protocol modes.

While a hardware switching from one signal processing unit to another one may be done in accordance with a change in protocol mode, there does not need to be a one-to-one correspondence between signal processing units and associated protocol modes. For illustration, the second signal processing unit does not need to be deactivated at all, e.g. when the second signal processing unit has a power consumption which is much less than that of the first signal processing unit. Alternatively or additionally, the switching from one signal processing unit to another signal processing unit may occur with a time-offset relative to a mode switching. For illustration, when a second protocol mode associated with lower power consumption is activated at a certain time, the hardware switching which deactivates one of the signal processing units may be postponed until the second protocol mode has been active for a predefined time period and/or until the cellular communication network has rejected a request for reverting to the first protocol mode. For further illustration, a hardware switching may be performed conditionally dependent upon additional criteria when a protocol mode is changed. Examples for such additional criteria include the incoming and/or outgoing data traffic of the mobile terminal, the state of the display of the mobile terminal, and/or the applications that are being executed on the mobile terminal.

The operation of the various functional units may be implemented by hardware, by software, or a combination thereof. For illustration, the functions of the logic which selects a protocol mode may be performed by a microprocessor or microcontroller which executes instructions programmed in a non-volatile memory.

Devices, systems and methods according to embodiments allow a change between various protocol modes to be combined with hardware switching. This allows different hardware to be used for optimized resource utilization, while the mobile terminal is still able to use the same core communication protocol, e.g. the WCDMA or LTE standard.

The invention claimed is:

1. A mobile terminal, comprising:
   a wireless interface for communication with a cellular communication network, and
   a control unit, at least partially implemented in hardware, configured to:
      control the wireless interface to perform a mode switching signaling to cause activation of a protocol mode selected from a plurality of protocol modes for communicating over the wireless interface, and
      selectively perform hardware switching that activates or deactivates at least one signal processing unit as a function of the selected protocol mode based on whether an anticipated reduction in power consumption caused by the hardware switching exceeds a power consumption to perform the hardware switching,
         the at least one signal processing unit being configured to process data received or transmitted via the wireless interface.

2. The mobile terminal of claim 1, comprising:
   a first signal processing unit, of the at least one signal processing unit, connected to the wireless interface, and
   a second signal processing unit, of the at least one signal processing unit, connected to the wireless interface,
   the control unit, when selectively performing the hardware switching, being configured to:
      activate the first signal processing unit and deactivate the second signal processing unit when a first protocol mode, of the plurality of protocol modes, is selected, and
      activate the second signal processing unit and deactivate the first signal processing unit when a second protocol mode, of the plurality of protocol modes, is selected.

3. The mobile terminal of claim 2,
   wherein the wireless interface comprises:
      an antenna for transmitting and receiving data symbols, and
   wherein the first signal processing unit is coupled to the antenna to process the data of a data symbol when the first protocol mode is selected, and
   wherein the second signal processing unit is coupled to the antenna to process the data of a data symbol when the second protocol mode is selected.

4. The mobile terminal of claim 2,
   wherein the first signal processing unit is a first baseband unit, and
   wherein the second signal processing unit is a second baseband unit different from the first baseband unit.

5. The mobile terminal of claim 2,
   wherein the first signal processing unit has a first power consumption, and
   wherein the second signal processing unit has a second power consumption which is less than the first power consumption.

6. The mobile terminal of claim 2,
   wherein the first signal processing unit is a first digital signal processing unit, and
   wherein the second signal processing unit is a second digital signal processing unit.

7. The mobile terminal of claim 2,
   wherein the first protocol mode has a first data rate for communication via the wireless interface, and
   wherein the second protocol mode has a second data rate for communication via the wireless interface, the second data rate being less than the first data rate.

8. The mobile terminal of claim 2,
   wherein the first protocol mode has a first latency, and
   wherein the second protocol mode has a second latency, the second latency being longer than the first latency.

9. The mobile terminal of claim 2,
   wherein the second protocol mode is a Machine-to-Machine type communication mode.

10. The mobile terminal of claim 1,
    wherein the control unit is further configured to:
       select the protocol mode from the plurality of protocol modes,
       control the wireless interface to transmit a protocol mode change request which includes an indicator for the selected protocol mode, and
       based on receiving a protocol mode change response, control the wireless interface in accordance with the selected protocol mode.

11. The mobile terminal of claim 10,
    wherein the control unit is further configured to:
       determine, based on receiving the protocol mode change response, whether the at least one signal processing unit is to be activated or deactivated.

12. The mobile terminal of claim 1,
    wherein the selected protocol mode and at least one other protocol mode, of the plurality of protocol modes, have different parameter settings for physical layer signaling between the mobile terminal and the cellular communication network.

13. A method comprising:
    performing, by a mobile terminal, a mode switching signaling to cause activation of a protocol mode selected from a plurality of protocol modes for communicating over a wireless interface of the mobile terminal, and
    selectively performing hardware switching by activating or deactivating at least one signal processing unit of the mobile terminal as a function of the selected protocol mode and based on whether an anticipated reduction in power consumption caused by the hardware switching exceeds a power consumption to perform the hardware switching,
       the at least one signal processing unit being operative to process data received or transmitted via the wireless interface.

14. The method of claim 13,
    wherein the mobile terminal includes a first signal processing unit, of the at least one signal processing unit, and a second signal processing unit, of the at least one signal processing unit, and
    wherein selectively performing the hardware switching further comprises:

activating the first signal processing unit and deactivating the second signal processing unit when a first protocol mode, of the plurality of protocol modes, is selected, and activating the second signal processing unit and deactivating the first signal processing unit when a second protocol mode, of the plurality of protocol modes, is selected.

15. The method of claim 14,
wherein the first signal processing unit is a first baseband unit, and
wherein the second signal processing unit is a second baseband unit different from the first baseband unit.

16. The method of claim 14,
wherein the first signal processing unit has a first power consumption, and
wherein the second signal processing unit has a second power consumption which is less than the first power consumption.

17. The method of claim 14,
wherein the first signal processing unit is a first digital signal processing unit, and
wherein the second signal processing unit is a second digital signal processing unit.

18. The method of claim 14,
wherein the first protocol mode has a first data rate for communication via the wireless interface, and
wherein the second protocol mode has a second data rate for communication via the wireless interface,
the second data rate being less than the first data rate.

19. The method of claim 13, where selectively performing hardware switching is based on an estimated amount of time the mobile terminal is to be in the selected protocol mode.

20. A non-transitory computer-readable medium for storing instructions, the instructions, comprising:
a plurality of instructions, which when executed by one or more control units of a device, cause the one or more control units to:
control a wireless interface, of the device, to perform a mode switching signaling to cause activation of a protocol mode selected from a plurality of protocol modes for communicating over the wireless interface; and
selectively perform hardware switching that activates or deactivates at least one signal processing unit, of the device, as a function of the selected protocol mode based on
whether an anticipated reduction in power consumption caused by the hardware switching exceeds a power consumption to perform the hardware switching,
the at least one signal processing unit being configured to process data received or transmitted via the wireless interface.

* * * * *